May 15, 1956 J. A. HJULIAN 2,745,427
TRIPPER ROD MECHANISM
Filed Dec. 8, 1951 4 Sheets-Sheet 1

Inventor:
Julius A. Hjulian.
By Joseph O. Lang
Atty.

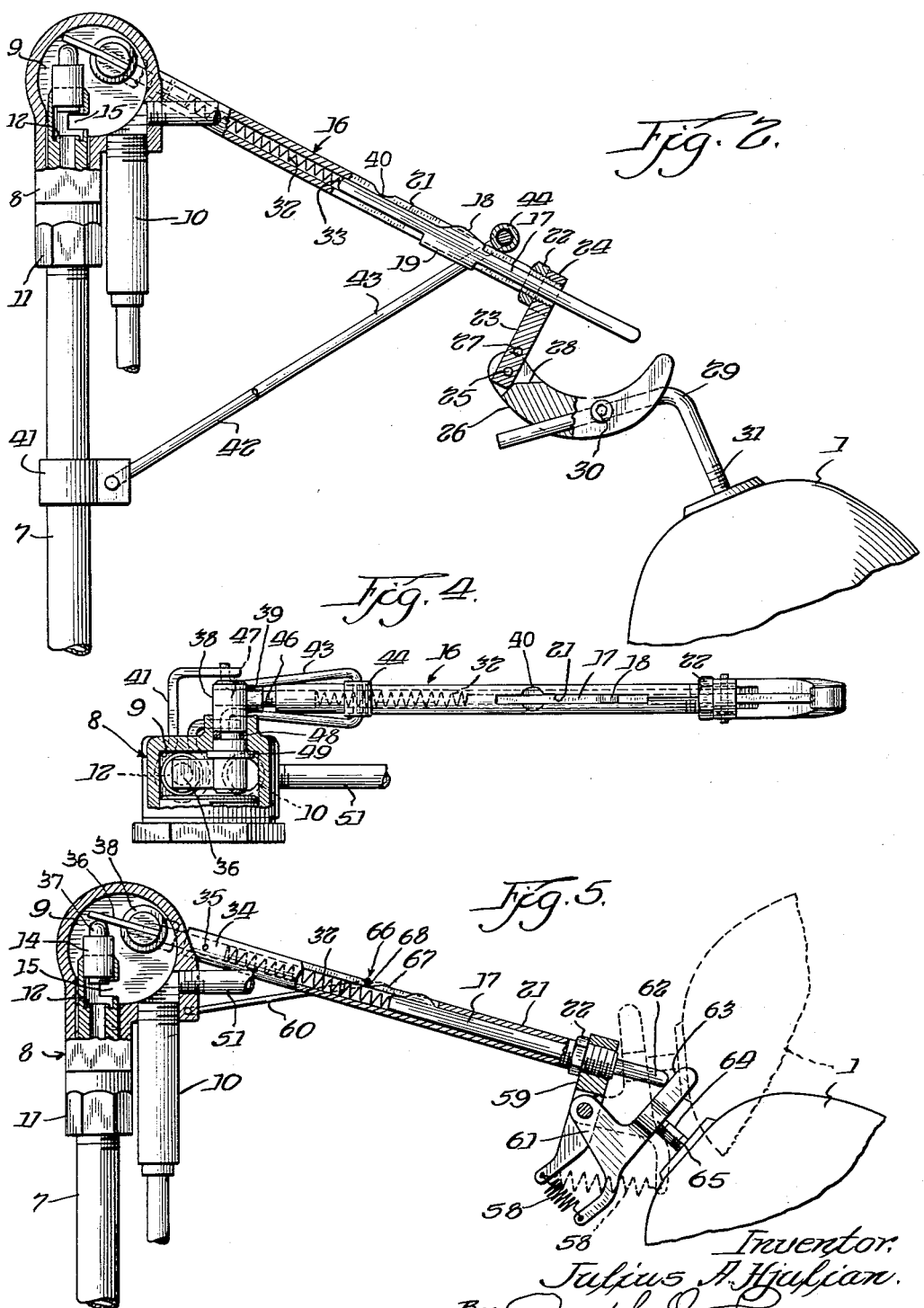

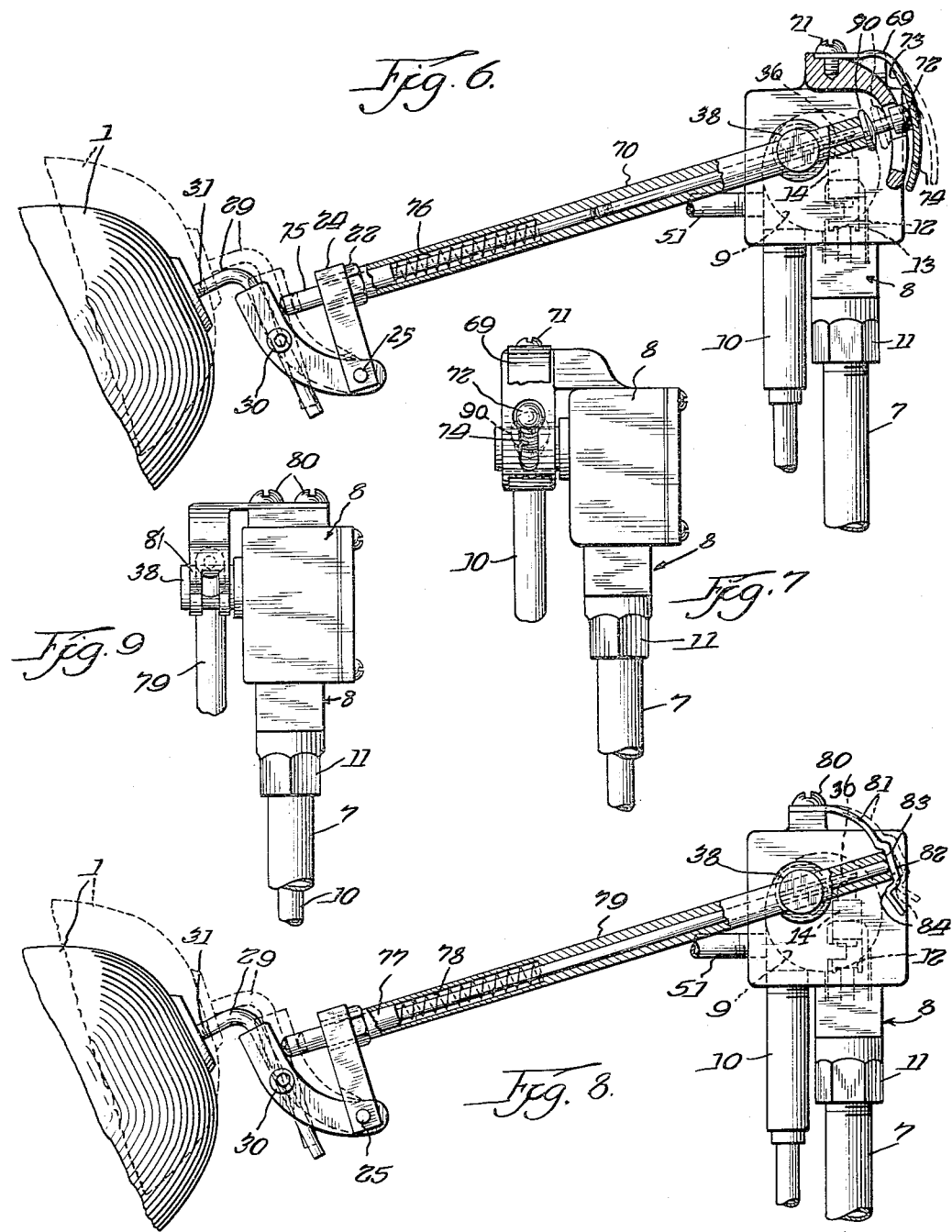

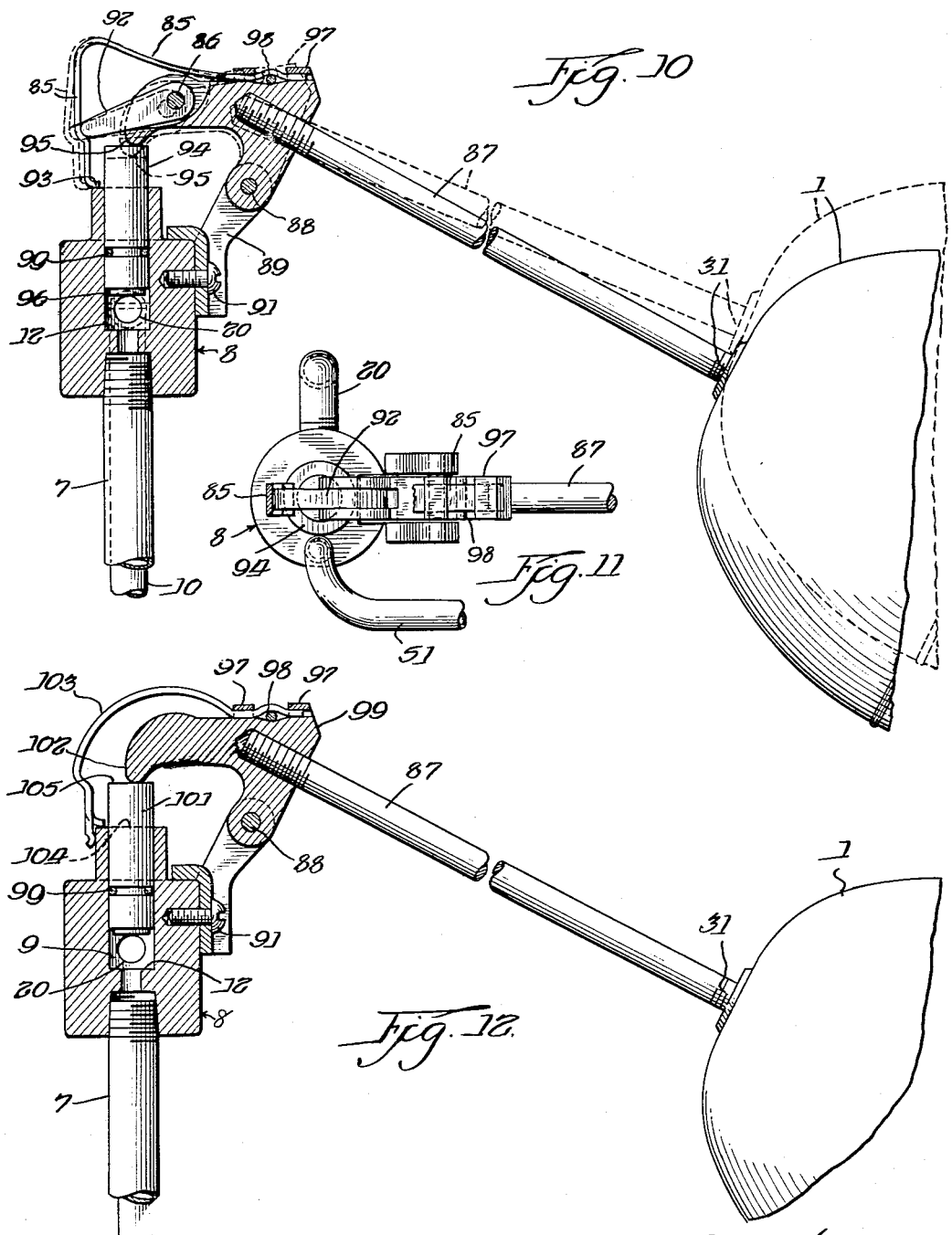

United States Patent Office 2,745,427
Patented May 15, 1956

2,745,427
TRIPPER ROD MECHANISM

Julius A. Hjulian, Palos Heights, Ill., assignor to Crane Co., Chicago, Ill., a corporation of Illinois Application December 8, 1951, Serial No. 260,631

9 Claims. (Cl. 137—420)

This invention relates to a valve tripper rod mechanism useful, for example, in connection with operating tank valves in connection with plumbing flush closets or the like.

More specifically, the invention is concerned with a novel tripper rod mechanism adaptable for use with a tank filling valve, allowing for the seat opening in the float actuated valve to be maintained in substantially fully open position for a predetermined time, at the end of which period, the tripper rod will allow for rapid closing and thereby eliminate an objectionable condition prevalent in present existing devices.

Heretofore, one of the principal objections to valves of this general character has been the tendency for the valve seats and disc or closure members to wear unusually rapidly because of the relatively long prior throttling condition or slow closing operation relative to the inlet seat opening and leading eventually to what is termed by those skilled in the art as wire-drawing of the valve seat. The result was valve leakage.

Thus, it is one of the more important objects of this invention to provide a structure which gives the assurance of longer life to the valve seat.

Another object is to provide for a structure in which a more rapid fill of the tank or other container will take place in a shorter period of time than heretofore obtained.

Another object is to accomplish the elimination of prior objectionable noises due to liquid throttling by providing a wide open orifice effective substantially throughout the travel of the float member, this desirable result being attained by the fact that the trip rod of this invention features a snap action in which rapid closing of the tank supply valve will occur only after predetermined pivotal movement of the float rod in cooperation with the tripper rod mechanism as hereinafter described.

Heretofore, it should be understood that the float member connected to the conventional shutoff stem of a float rod in its response has moved slowly with the rise in water level in the tank, and, accordingly, has throttled or partially closed the seat opening until the valve was finally seated or the inlet or outlet opening was actually shut off, resulting in said objectionable wear in the seat and disc.

Thus, it is one of the more important objects of this invention to avoid previous objectionable wire-drawing or cutting away of the valve seats, while at the same time, permitting the tank to be filled more rapidly and with comparatively little noise or vibration.

Other objects and advantages will become more readily apparent upon proceeding with the following specification read in light of the accompanying drawings, in which Fig. 1 is a preferred form of my invention in which it is shown as applied to a conventional plumbing closet filling tank.

Fig. 2 is a fragmentary sectional view of the structure shown in connection with Fig. 1, in which the tank float member is in the lowermost position or tank filling position.

Fig. 4 is a transverse sectional view taken on the line 4—4 of Fig. 1.

Fig. 5 is a fragmentary sectional view of a modified form of structure.

Fig. 6 is a fragmentary sectional view of a further modified form.

Fig. 7 is an end exterior view of the structure referred to in Fig. 6.

Fig. 8 is a sectional fragmentary view of a further modified form.

Fig. 9 is an end exterior view of the casing referred to in Fig. 8.

Fig. 10 is a fragmentary sectional view of a further modified form of the invention.

Fig. 11 is a fragmentary plan elevation of the structure shown in Fig. 10.

Fig. 12 is a fragmentary sectional view of a still further modified form of the invention.

Similar reference numerals refer to similar parts throughout the several views.

Figure 1:
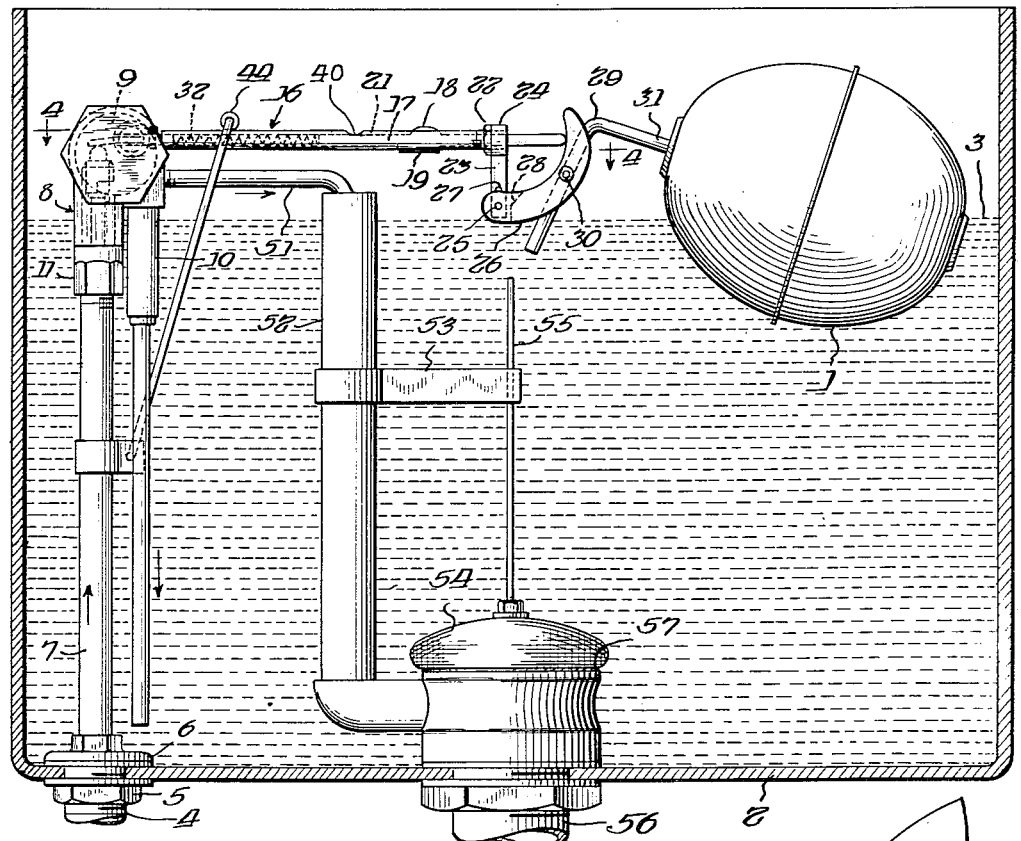

In referring now to Fig. 1, it should be understood at the outset that the ball float, generally designated 1, is shown at its uppermost or top position within the tank 2, as indicated by the water level therewithin designated 3, and which latter position is attained after release of the tripper rod mechanism as hereinafter described in more detail.

The tank filling structure consists essentially of the inlet supply pipe 4, connected by suitable means, such as attachment nuts 5 and 6, applied in leakproof relation to the bottom of the tank 2 and having the inlet standpipe 7 threadedly or otherwise connected to the nut 6. The interior of the tubing 7 thus is in communication with the interior of the supply pipe 4. At the upper end of the inlet standpipe 7 is the valve casing generally designated 8, the casing being provided with the usual valve chamber 9, and an outlet or discharge therefrom, as shown more clearly in Fig. 3, which discharges into the tank.

A seat member or bushing 11 serves the dual purpose as the connecting means for the casing 8 in its attachment to the pipe 7, as well as providing the valve seat therefor. At the upper end of the member 11 is the annular valve contact surface 12, having a cage-like ported extension therefrom designated 13 within which cage the closure member or disc 14 is positioned for suitable axial movement relative thereto in opening and closing the valve. The cage extension 13 is provided with an arcuately extending port or opening 15 providing for the discharge of liquid therepast when the valve is in the open position and the tank float 1 is in its lowermost position as shown iin Fig. 3. Thus, it will be apparent that fluid pressure is applied underneath the valve disc 14 and will tend therefore to lift the latter member from the seat 12 when the closing effort from above provided by the combined float and rod mechanism is relieved.

For purpose of providing the desired actuation of the closure member or disc 14, a pivotally movable actuating rod member, generally designated 16 is provided which is hollow and tubular in form and is furnished with an inner or telescopically mounted rod 17 having an outer cam surface 18 for purposes hereinafter explained, and a lower extension 19 therefrom which is movable within the elongated slot 21 on the underside of the rod 16 when actuated as hereinafter described. At the float end or righthand end portion of the actuating or tripper rod mechanism, it is fitted with a locknut 22 and a downwardly projecting lever mounting portion 23 threadedly attached, by means of the collar 24 to the slotted outer rod 16. At the lower end portion thereof, the downwardly extending mounting 23 is mounted on the pin 25 which supports the crescent-shaped combined cam and lever 26 for permitting the pivotal movement of the latter mentioned lever at a bifurcated end thereof. A through stop pin 27 engages predeterminately an end limit of the bifurcated portion to define the upward arcuate movement of the crescent formed lever member 26 by means of the abutting surface 28 as indicated. Preferably pivotally mounted to the side wall or to a bifurcated portion of the crescent-shaped cam and lever member 26, the angular rod 29 is threadedly attached as at 31 to the ball float 1. At the opposite or lefthand end of the tubular tripper rod 16, as shown more clearly in Figs. 2 and 3, a coiled spring 32 is provided therewithin bearing against the end surface 33 of the relatively axially movable inner rod 17. The coiled spring 32 contained within the tubular portion of the tripper rod 16 bears against the projecting extension 34, the latter being pinned as at 35 against relative axial movement and having the flattened extension portion 36 normally bearing against the rounded projecting portion 37 of the closure member 14. The hollow tripper rod 16 is pivotally movable on the transverse rotatable shaft 38 and is connected to the said shaft by means of the locknut 39.

Pivotally attached by means of the clamp 41, a bifurcated rod 42 of inverted U-form is provided carrying at the upper end of each bifurcated portion 43 a roller 44 journalled on the shaft portion 45. As shown in Fig. 2 in the unfilled position of the tank, which is when the float 1 is in its lowermost position as shown in Fig. 2, the bifurcated pivotally movable rod 42 with its roller 44 will assume the position indicated therein, and in the latter position the inner axially movable rod assumes the position indicated relative to the outer rod 16. It will be noted that in the latter position, the coil spring 32 has caused the inner rod 17 to be projected outwardly after suitable axial movement within the slot 21 to the extended position shown in Fig. 2. The roller 44 has moved over the edges defining the slot 21 and has stopped beyond or below the cam surface 18. Thus, it should be clear now that as the rod 21 is acted upon by the crescent shaped lever 26, as shown more clearly in Fig. 3, it is moved telescopically inwardly within the outer rod 16.

Figure 3:
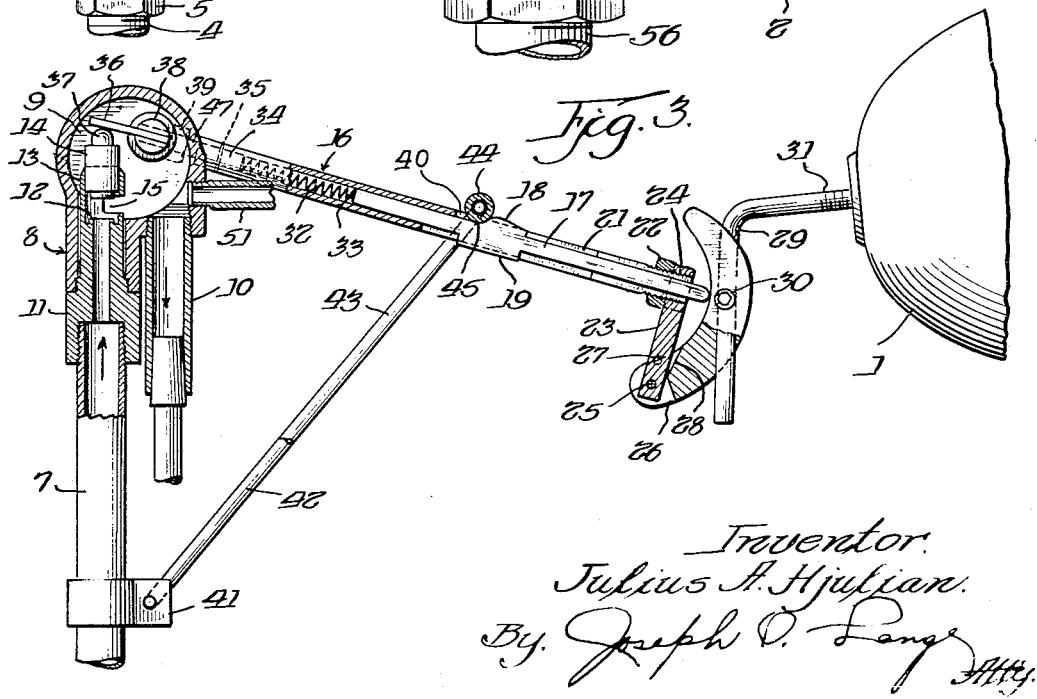
Fig. 3 is a sectional view of the structure referred to in Figs. 1 and 2 with the ball float in nearly filled position of the tank.

However, before the latter movement of the inner rod 17 takes place the assembly comprising respectively the float 1, the angular lever 29, the crescent-shaped lever 26, the depending lever mounting portion 23, and hollow rod 16 under the influence of the rising water in the tank will move upwardly, and thereby initiate the movement of the pivotal rod 42 and the roller 44 to engage the slot 40, as shown in Fig. 3. When the latter locking effect of the roller 44 within the slot 40 has taken place, the pivotal movement of the crescent-shaped lever 26 will have started to act against the end of the inner rod 17, as shown in Fig. 3. It should also be noted that at this stage of movement the roller 44 actually will have climbed the cam surface 18 because of having been displaced from the notch or slot 40 by contact of the roller with the corner forward edge portion of the slot 40. Under this condition, it will, of course, also become apparent that the outer hollow rod member 16 is not pivotally moved. Instead, the float member 1 which is pivotally mounted as at 30 and is pivotally movable as at 25 with the crescent-formed lever 26 will continue to move pivotally with the rise of water within the tank 2, until nearly the desired depth is reached. At this stage, as shown in Fig. 3, the projecting cam surface portion 18 on the inner rod 17 has thus reached the axial position telescopically within the outer rod member against the action of the spring 32 in which by continuing its inward movement axially it causes the cam surface portion 18 to be moved under the roller 44 to the position illustrated in Fig. 3, at which point the roller 44 is released from the notch 40 to move along the unslotted outside portion of the tubular rod 16 to the position shown in Fig. 1. Thus, the inhibiting effect of the lever 42 in holding the tripper rod 16 down and against pivotal movement is removed, and, upon the occurrence of such movement of the roller 14, the pivotal mounting on the shaft 38 becomes effective. During the course of movement of the hollow lever 16 to the position indicated, the flattened portion 36 of the extension 34 is caused to move pivotally downward against the closure member 14 to force the latter element against the seat 12 and thereby shut off the inlet float supply, in which position the lever assumes the valve closing position shown in Fig. 1. Thus, it will be clear that by this action, the quick closing of the valve 14 takes place to eliminate the objectionably slow throttling action previously complained of in this type of construction.

It should be understood that after the instant of said release of the roller 44 from the slot or notch 40 in view of the tension produced by the spring 32 (and this action also applies to the several constructions shown and described in connection with Figs. 5 to 9 inclusive) and also because the float 1 has heretofore been partly submerged, the crescent-shaped lever 26 will be forced outwardly and also causes the ball float 1 to be moved pivotally with the lever, creating added resistance or load on the spring 32 in the upward movement of the float assembly. Thus, as shown in Fig. 1, the overall effect will be to cause the said crescent-shaped lever 26 to be forced pivotally outward to carry the float 1 with it from the partly submerged position referred to. At the stage of the tank filling operation, it has been found that the float 1 will actually bound upwardly but before it reaches the upper surface of the water, it will have encountered the tension of the said spring 32 and will thereby be forced downward to the position illustrated in Fig. 1. The immediate effect will of course be to pivotally move the entire rod assembly of 16 upwardly and quickly force the rounded portion 37 of the closure member 14 against the seat 12 effected through the flattened lever portion 36.

The action hereinabove described will also be applicable to the constructions shown and described in connection with Figs. 5 to 9, inclusive.

The shaft 38 is mounted as shown in more detail in Fig. 4, in which the pivotal movement of the tripper rod 16 consists of a threaded connecting means 46, the shaft 38 having a transverse connection for the extension 47 received within the shaft 38 and held in locked position therewith by means of the locknut 39.

Directing attention to Fig. 3, the valve chamber 9 of the casing 1 leads to the usual discharge outlet 10, which empties into the tank proper. The shaft 38 is preferably sealed by means of the O-ring 48 (see Fig. 4), the shaft being shouldered within the chamber 9, as at 49. The chamber 9 is provided with the refill outlet 51 emptying, as shown more clearly in Fig. 1, into the overflow discharge pipe or outlet 52. The latter member supports the guide member 53 of the actuating valve 54 for discharge of the tank contents and with the guide rod 55 mounted to permit reciprocating movement of the valve 54 to allow for the usual discharge of liquid 56 past the valve seat 57 into a water closet or other water receiving device.

Thus, it will be apparent that an effective structural arrangement has been provided permitting rapid filling of a tank or other container and at the same time minimizing the previous valve seat cutting by virtually eliminating the throttling action of the closure member in the course of filling the tank.

Referring now to the modified structure shown in Fig. 5, the operating mechanism is in general similar to that described in connection with Figs. 1 to 4, inclusive. However, in this construction, a spring mechanism 58 is interposed between the rod support 59 so as to draw the pivotally mounted lever 61 which is of Y-form normally downward and allow the rod 17 within the slotted portion 21 to be withdrawn. This action allows the rod 17 to drop to the lowermost outer position as shown at 62 and at the latter position to bear against the surface 63. In this structure, it will be noted that the rod 64 for the float ball 1 is attached to the Y-lever 61 by means of the threaded portion 65, as indicated. As shown in the dotted lines, upon the rise in water level occurring within the tank, the float ball will correspondingly move upwardly against the resistance offered by the spring 58 and ultimately assume the position shown in the dotted lines. At this stage of action, the pivotally movable restraining hasp 66 will be released by virtue of the cam surface 67 operating to pass under the transverse portion 68 of the said hasp after which action the relative telescopic movement of the lever 17 in the slot 21 will cease and the entire rod assembly will move pivotally to actuate the closure member 14 in the same manner as previously described in connection with the other figures. In this structure, the spring 32 will be similarly compressed against the rod extension 34 which is pinned at 35 to prevent relative axial movement. The cycle of operation relative to opening and closing the valve can be repeated as described in connection with Figs. 1 to 4, inclusive, and in all other respects, it is similar to that described in connection with the other figures. Thus, again by relative axial movement between telescopically arranged levers the ball float can move independently without affecting the wide open position of the valve until the tank is filled nearly to the desired level.

Referring now to the further modifications shown in Figs. 6 and 7, it has been found that instead of having a cam surface and roller, such as those elements designated 44 and 68 in Figs. 3 and 5 respectively, it is desirable under certain conditions to provide a structure whereby the cam surface may be formed by the resilient element itself in addition to providing the necessary resistance for effecting the relative axial movement between the telescoped rod members 70 and 75. This arrangement is shown more clearly in Fig. 6, in which a leaf-type spring member 69 is mounted on top of the casing 8 by means of the positioning screw 71. Here, the spring member 69 resists the pivotal movement of the trigger rod 70 on the shaft 38 both frictionally and resiliently until the end telescoped portion 72 with its headed portion moving along arcuately on the under surface 73 of the spring reaches the relieved portion 74 thereon as more clearly shown in Fig. 7, and allows the head 72 to project therethrough as shown in Fig. 7. Upon the axial movement of the headed rod 72, the shaft 70 which has previously been restrained against pivotal movement is moved, the latter member being pivotally mounted as at 38 in the same manner as described in connection with the other figures. Until such projection by the head end portion 72 past the recess 74 occurs, the ball float 1 will move pivotally relative to the mounting 30 on the rod 29, as described in connection with Fig. 1, thus causing the telescoping lower rod member 75 to move against the action of the coil spring 76 until the leaf-spring member 69 reaches the position shown in the dotted lines of Fig. 6. At this position, the ball float 1 will have reached the relatively higher level shown in dotted lines. In all other respects, the operation is also similar to that described in connection with the previous figures and the delayed action in closing or partially closing the valve is accomplished in the same manner.

In Figs. 8 and 9, a construction similar to that described in connection with Figs. 6 and 7 is shown as a further modified form. In the instant form, the inward movement of the inner telescoped shaft 77 is so mounted as to resist the tension of the coil spring 78. The shaft 77 moves within the hollow shaft 79 axially relative thereto thereby to allow for the subsequent deflection of the leaf spring 81 outwardly to the dotted position indicated, the end projecting portion 82 of the spring then being displaced to a position sufficiently beyond for clearance to allow for the pivotal movement of the outer rod 79.

The spring is mounted on the casing 8 by means of the screws 80. Thus, it will be clear that the end surface 83 of the rod 77 will move axially against the undersurface 84 of the leaf spring 81, to similarly permit relative pivotal movement of the ball float 1 at pivotal locations 30 and 25 in the manner and in the same sequence as described in connection with the previous figures. In all other respects, the principle of operation is the same as that described for the previous figures, and thus again the closure member 14 will be closed only after predetermined axial movement of the inner rod 77 relative to the outer tubular rod 79.

In the modified form of Figs. 10 and 11, a pivotal lever is employed in connection with the leaf spring 85, and the spring deflecting lever 92 being pivotally mounted as at 86 and similarly permitting relative pivotal movement of the rod 87 mounted as at 88 on the bracket support 89 which is attached to the casing 8 by the screws 91. In this construction, upon movement of the float 1 upwardly in response to a rise in water level, the pivotal lever 92 moves upwardly thereby to bear against the inner surface of the spring 85 and finally deflects the latter member outwardly as indicated to the position shown in the dotted lines, so as to thus cause the lower end of the spring 85 to move away from the shoulder at 93 and thereby allow for the closure 94 under influence of the integral extension 95 to move downwardly (per dotted lines) in the manner illustrated, the valve disc or closure member 96 then being seated at 12 in the same way as described in connection with the previous figures. The spring 85 is held in place by means of the transverse resilient leaf members 97, as shown more clearly in Fig. 11, which general type of construction allows for the proper tension and adjustment of the spring 85 by means of the inserted pin 98.

In connection with the modified form of construction shown in Fig. 12, the compound leverage referred to in Figs. 11 and 12 is dispensed with because the pivotally mounted lever 99 here bears against the disc or closure member 101, as at 102, and upon predetermined movement will cause the leaf spring 103 to be displaced from the shoulder 104, in which case the immediate effect will be to overcome the resistance of the spring 103 and allow for the float leverage from the member 1 to be applied directly to the closure member 101 in seating the valve, as at 12. In this structure, as in Fig. 11, the disc may also be sealed by means of the sealing rings 90. Normally while resisting the tension of the spring 103, the lever 102 will move transversely across the uppermost surface 105 of the closure 101. The compound leverage found desirable in a tripping mechanism is exemplified in a relatively simple structure, which effectively permits action resiliently of the tripper rod against the spring whether telescopically or otherwise mounted, and, after predetermined arcuate travel by the float rod has been completed, the pivotal movement and closing action of the latter member will continue to be applied directly to the closure member.

While several modifications have been shown and described, it should, of course, be obvious that a number of other structural arrangements may be employed to accomplish a similar result within the spirit of the invention as defined by the appended claims.

I claim:

1. A closure member and tripper rod mechanism for a tank valve or the like, the combination of a valve including a casing therefor, a float member movable within a tank, a reciprocally movable closure member within the said valve casing actuated by the said float member, a tripper rod comprising telescoping elements for actuating said closure member, one of the said latter elements being axially movable, a releasable latch means cooperating with the telescoping elements, resilient means interposed between said telescoping elements to oppose the axial movement of one of the telescoping elements, the said telescoping elements being pivotally movable relative to the said closure member, the outer one of said telescoping elements supporting the inner one of the said telescoping elements, a pivotally mounted member carried by one of said telescoping elements, the said latter pivotally mounted member having a transverse surface portion bearing against an end of the other of said telescoping elements, the said latch means predeterminately engaging one of the said telescoping elements whereby upon movement of said float member and predetermined axial movement of one of said telescoping elements relative to the other of said telescoping elements, the said latch means is released to permit pivotal movement of the said tripper rod to effect closing of the valve.

2. A closure member and tripper rod mechanism for a tank valve or the like, the combination of a valve including a casing therefor, a float member movable within a tank, a reciprocally movable closure member within the said valve casing actuated by the said float member, a tripper rod comprising telescoping elements cooperating with said float member for actuating said closure member, one of the said telescoping elements being axially movable, a releasable latch means pivotally movable relative to the said casing and cooperating with the said telescoping elements, means interposed between said telescoping elements to oppose resiliently the axial movement of one of the telescoping elements, the said telescoping elements being pivotally movable relative to the said closure member, one of said telescoping elements substantially enclosing the other of the said telescoping elements, a pivotally mounted member carried by the outer one of said telescoping elements, the said latter pivotally mounted member having a surface portion bearing against an end of the inner one of said telescoping elements, whereby upon movement of said float member and predetermined axial movement of one of said telescoping elements relative to the other of said telescoping elements, the said latch means is dislodged to release the said tripper rod to thereby effect closing of the valve by the float member.

3. A closure member and tripper rod mechanism for a tank valve or the like, the combination of a valve including a casing therefor, a float member pivotally movable within a tank, a reciprocally movable closure member within the said valve casing actuated by the said float member, a tripper rod comprising telescoping elements cooperating with said float member for actuating said closure member, one of the said latter elements being axially movable, the other of said telescoping elements supporting said float member, a releasable latch means having a portion slidably engageable with the inner one of said telescoping elements, resilient means mounted within one of said telescoping elements to cushion the axial movement of one of the telescoping elements upon release of said latch means, the said telescoping elements being pivotally movable relative to the said closure member, the outer one of said telescoping elements supporting the inner one of the said telescoping elements, a pivotally mounted member carried by the outer one of said telescoping elements, the said latch means upon predetermined movements of said float member and the inner one of said telescoping elements being released to permit pivotal movement of the said tripper rod to effect closing of the valve.

4. A combined closure member and tripper rod mechanism for a tank valve or the like, the combination of a valve including a casing therefor, a float member movable within a tank, a reciprocally movable closure member within the said valve casing actuated by the said float member, a tripper rod comprising telescoping elements for actuating said closure member, one of the said latter elements being axially movable, a releasable latch means cooperating with the telescoping elements, resilient means interposed between said telescoping elements to inhibit the axial movement of one of the telescoping elements, the said telescoping elements being pivotally movable relative to the said closure member, the outer one of said telescoping elements supporting the inner one of the said telescoping elements, a pivotally mounted member carried by the outer one of said telescoping elements, the said latter pivotally mounted member having a surface portion bearing against an end of the inner one of said telescoping elements, the said latch means including a second pivotally movable member cooperating with one of the said telescoping elements, the outer telescoping element having a notched surface engaged by said second pivotally mounted member, whereby upon movement of said float member relative to the inner telescoping element and subsequent axial movement of the inner one of said telescoping elements relative to the outer one of said telescoping elements, the said latch means is released to permit pivotal movement of the said tripper rod and effect quick closing of the valve.

5. In a closure member and tripper rod mechanism for a tank valve or the like, a valve with a casing therefor, a float member movable within a tank, a reciprocally movable closure member within the said valve casing actuated by the said float member, a tripper rod cooperating with said float member, the said tripper rod having telescoping elements for actuating said closure member, one of the said latter elements being axially movable, a releasable latch means cooperating with the telescoping elements, resilient means interposed between said telescoping elements to resist the axial movement of one of the telescoping elements, the said telescoping elements being pivotally movable relative to the said closure member, the outer one of said telescoping elements supporting the inner one of the said telescoping elements, a pivotally mounted member carried by the outer one of said telescoping elements, the said latter pivotally mounted member having a curved surface bearing against an end of the inner one of said telescoping elements normally projecting beyond the outer element, the said float member being pivotally movable relative to the casing and inner telescoping element, the said latch means engaging one of the said telescoping elements, the axial movement of the inner one of said telescoping elements relative to the outer one of said telescoping elements occurring upon said predetermined float member movement, whereby the said latch means is released to permit pivotal movement of the said tripper rod to effect valve closing.

6. A closure member and tripper rod mechanism for a tank valve or the like, the combination of a valve including a casing therefor, a float member pivotally movable within a tank, a reciprocally movable closure member within the said casing actuated by the said float member, a tripper rod comprising telescoping elements connected to the float member for actuating said closure member, one of the said latter elements being axially movable relative to the other element, a releasable latch means cooperating with the telescoping elements, resilient means cooperating with telescoping elements to limit the axial movement of one of the telescoping elements, the said telescoping elements being pivotally movable relative to the said closure member, the outer one of said telescoping elements enclosing the inner one of the said telescoping elements except for an aperture allowing for the projection of a portion of the said inner element therethrough, a pivotally mounted member having a surface portion predeterminately bearing against the projecting portion of the said inner telescoping element, the said latch means engaging the outer one of said telescoping elements, whereby upon pivotal movement of said float member against the said projection of inner one of said telescoping elements, the said latch means is released from its engagement of the outer telescoping element to permit further axial movement of the said inner telescoping element to effect closing of the valve.

7. The combination of a closure member and tripper rod mechanism for a tank valve or the like, a valve with a casing therefor, a float member pivotally movable relative to the said valve casing, a reciprocally movable closure member within the said casing actuated by the said float member, a tripper rod comprising telescoping elements cooperating with said float member for actuating said closure member, one of the said latter elements being axially movable, a releasable latch means mounted on the said casing and cooperating with the said telescoping elements, resilient means within said tripper rod to limit predeterminately the axial movement of one of the said telescoping elements, the latter elements being pivotally movable relative to the said closure member, a pivotally mounted member carried by one of said telescoping elements, the said latter pivotally mounted member having a cam surface portion bearing against an end of the other of said telescoping elements, whereby upon predetermined movement of said float member and said pivotally mounted member axial movement of the inner one of said telescoping elements is effected relative to the outer one of said telescoping elements, the said latch means being released by said movement of the inner telescopic element to permit continued pivotal movement of the float member to effect quick closing of the valve.

8. A closure member and tripper rod mechanism for a tank valve or the like, the combination of a valve including a casing therefor, a float member movable within a tank, a reciprocally movable closure member within the said valve casing actuated by the said float member, a tripper rod comprising telescoping elements cooperating with said float member for actuating said closure member, one of the said latter elements being axially movable, a pivotally movable latch means cooperating with the telescoping elements, resilient means interposed between said telescoping elements to inhibit the axial movement of one of the telescoping elements, the said telescoping elements being pivotally movable relative to the said closure member, the outer one of said telescoping elements supporting the inner one of the said telescoping elements, a pivotally mounted member on the said tripper rod, the said latter pivotally mounted member having a surface portion movable transversely across an end portion of the inner one of said telescoping elements, whereby upon movement of said float member and predetermined relative axial movement of one of the said telescoping elements, the said latch means is released and pivotally moved in a direction toward the casing to effect rapid closing of the valve.

9. A closure member and tripper rod mechanism for a tank valve or the like, the combination of a valve including a casing therefor, a float member movable within a tank, a reciprocally movable closure member within the valve casing cooperating with the said float member, a tripper rod therefor comprising telescoping members connecting the said closure member with the said float member, resilient means cooperating with the said telescoping members to oppose the axial movement of the inner one of said telescoping members, the said telescoping members being pivotally movable as a unit relative to the said closure member, a pivotally mounted member carried by one of said telescoping members and having a surface portion bearing against an end of the other of said telescoping members whereby upon predetermined movement of the said float member and predetermined pivotal movement of the telescoping members one of said telescoping members is moved axially relative to the other and effects a release from the said resilient means to permit pivotal movement of the tripper rod and closing the valve.

References Cited in the file of this patent
UNITED STATES PATENTS

| | | |
|---|---|---|
| 2,296,219 | Miller | Sept. 15, 1942 |
| 2,308,347 | Asselin | Jan. 12, 1943 |
| 2,527,199 | Sadwith | Oct. 24, 1950 |